(12) United States Patent
Elaan et al.

(10) Patent No.: US 11,169,382 B2
(45) Date of Patent: Nov. 9, 2021

(54) WIRELESS DATA TRANSPORT SYSTEM FOR HEAD-MOUNTED DISPLAYS

(71) Applicant: Valve Corporation, Bellevue, WA (US)

(72) Inventors: Staci Jane Elaan, Bellevue, WA (US); Eric Judson VanWyk, Seattle, WA (US); Montgomery Vincent Goodson, Kirkland, WA (US)

(73) Assignee: Valve Corporation, Bellevue, WA (US)

( * ) Notice: Subject to any disclaimer, the term of this patent is extended or adjusted under 35 U.S.C. 154(b) by 131 days.

(21) Appl. No.: 16/258,342

(22) Filed: Jan. 25, 2019

(65) Prior Publication Data

US 2020/0241306 A1 Jul. 30, 2020

(51) Int. Cl.
| | |
|---|---|
| *H04M 1/00* | (2006.01) |
| *G02B 27/01* | (2006.01) |
| *H01Q 21/29* | (2006.01) |
| *G02B 27/00* | (2006.01) |
| *H04B 7/06* | (2006.01) |

(52) U.S. Cl.
CPC ..... *G02B 27/0176* (2013.01); *G02B 27/0093* (2013.01); *H01Q 21/293* (2013.01); *H04B 7/0617* (2013.01); *G09G 2370/16* (2013.01)

(58) Field of Classification Search
CPC ........ H01Q 1/241; H01Q 3/02; H01Q 3/2605; H01Q 1/243; H01Q 21/293; G02B 27/0093; G02B 27/0176; G09G 2370/16
See application file for complete search history.

(56) References Cited

U.S. PATENT DOCUMENTS

| | | | |
|---|---|---|---|
| 8,446,317 B1 | 5/2013 | Wu et al. | |
| 9,203,494 B2 | 12/2015 | Tarighat Mehrabani et al. | |
| 10,411,765 B2* | 9/2019 | Islam | H04L 5/0048 |
| 10,771,135 B2* | 9/2020 | Sheldon | H04B 7/0617 |
| 2012/0124169 A1* | 5/2012 | Solomon | H04N 5/765 |
| | | | 709/217 |

(Continued)

FOREIGN PATENT DOCUMENTS

WO 2017/184190 A1 10/2017

*Primary Examiner* — Nhan T Le
(74) *Attorney, Agent, or Firm* — Seed Intellectual Property Law Group LLP (57) ABSTRACT

Systems and methods for providing low latency and high bandwidth wireless data transport for various applications, such as virtual reality, augmented reality, or video applications. A wireless data transport system is provided that includes an electrically steerable antenna, such as a phased-array antenna, that is operative to selectively steer its beam based on control input. The wireless data transport system includes a tracking subsystem that is operative to track a mobile wireless device (e.g., head-mounted display (HMD), tablet computer, smart phone) as the mobile wireless device moves around in a tracked volume. The wireless data transport system utilizes the known position, orientation, or movement of the mobile wireless device receiving the data (e.g., video data) from the tracking subsystem and compensates for movement of the mobile wireless device by selectively adjusting the beamforming pattern of the steerable antenna based at least in part on the tracking data received from the tracking subsystem.

33 Claims, 4 Drawing Sheets

(56) References Cited

U.S. PATENT DOCUMENTS

| | | |
|---|---|---|
| 2014/0085483 A1 | 3/2014 | Leung et al. |
| 2016/0131761 A1 | 5/2016 | Yates et al. |
| 2017/0045941 A1 | 2/2017 | Tokubo et al. |
| 2017/0180028 A1 | 6/2017 | Maltsev et al. |

* cited by examiner

WIRELESS DATA TRANSPORT SYSTEM FOR HEAD-MOUNTED DISPLAYS

BACKGROUND

Technical Field

The present disclosure generally relates to wireless data transport systems and methods.

Description of the Related Art

One current generation of virtual reality ("VR") experiences is created using head-mounted displays ("HMDs"), which can be tethered to a stationary computer (such as a personal computer ("PC"), laptop, or game console), combined and/or integrated with a smart phone and/or its associated display, or self-contained. Generally, HMDs are display devices, worn on the head of a user, which have a small display device in front of one (monocular HMD) or each eye (binocular HMD). The display units are typically miniaturized and may include CRT, LCD, Liquid crystal on silicon (LCos), or OLED technologies, for example. A binocular HMD has the potential to display a different image to each eye. This capability is used to display stereoscopic images.

VR systems require large amounts of video data to provide a quality VR experience. Further, the video data must be provided with low latency (e.g., less than 20 ms) to prevent the user from feeling dizzy or nauseous due to lag between movement of their head and corresponding changes in the scene display. This requirement is referred to as "motion to photons," or MTP. Thus, the amount of data required to provide suitable performance can be very high (e.g., 1 Gb/s, 3 Gb/s, or more). Current wireless systems, such as IEEE 802.11ac, struggle to maintain high throughput levels, especially during movement of the HMD worn by the user or if other devices are present which may cause interference. Thus, to achieve the throughput required, most VR systems today utilize a wired tether between the mobile HMD worn by the user and a stationary computer sending the video data for display by the HMD.

BRIEF SUMMARY

A wireless data transport system may be summarized as including a tracking subsystem that in operation generates tracking data indicative of a physical position of a mobile wireless device as the mobile wireless device is moved in a tracked volume; an antenna array that is selectively configurable to provide a plurality of beamforming patterns; a radio frequency (RF) transmitter operatively coupled to the antenna array, in operation, the RF transmitter sends data wirelessly to the mobile wireless device via the antenna array; a beamforming controller operatively coupled to the tracking subsystem and the antenna array, in operation, the beamforming controller receives the generated tracking data from the tracking subsystem; and dynamically adjusts the beamforming pattern of the antenna array based at least in part on the tracking data received from the tracking subsystem.

The antenna array may include a planar phased-array antenna comprising plurality of antenna sub-elements. To dynamically adjust the beamforming pattern of the antenna array, the beamforming controller may dynamically adjust a beamforming weight for each of the plurality of antenna sub-elements to modify at least one of the phase shift or amplitude of each of the plurality of antenna sub-elements. The beamforming controller may directly calculate a value of the beamforming weight for each of the plurality of antenna sub-elements based on the tracking data received from the tracking subsystem. The beamforming controller may obtain a value of the beamforming weight for each of the plurality of antenna sub-elements from memory based on the tracking data received from the tracking subsystem. The RF transmitter may operate at one or more frequency bands between 30 GHz and 300 GHz. The RF transmitter may operate at the 60 GHz frequency band.

Tracking data generated by the tracking subsystem may further include orientation data that is indicative of the orientation of the mobile wireless device in the tracked volume. The tracking subsystem may generate tracking data indicative of a physical position of at least one object in the tracked volume other than the tracked mobile wireless device. The beamforming controller may dynamically adjust the beamforming pattern of the antenna array based at least in part on the tracking data indicative of the physical position of the at least one other object. The at least one other object may include at least one of a hand-held controller, a portion of a human body, a stationary object, or a physical boundary of the tracked volume. The tracking data may include prediction data indicative of a future physical position of the mobile wireless device. The beamforming controller may dynamically adjust the beamforming pattern of the antenna array based at least in part on the prediction data indicative of the future physical position of the mobile wireless device. The beam controller may receive quality data indicative of a quality of the wireless connection between the wireless data transport system and the mobile wireless device; and dynamically adjust the beamforming pattern of the antenna array based at least in part on the received quality data. The beam controller may receive quality data indicative of a quality of the wireless connection between the wireless data transport system and the mobile wireless device; store the quality data and corresponding tracking data; analyze the stored quality data and the corresponding tracking data; and dynamically adjust the beamforming pattern of the antenna array based at least in part on the analyzed quality data and the corresponding tracking data. The RF transmitter may send video data wirelessly to the mobile wireless device via the antenna array.

The RF transmitter is a first RF transmitter, and the wireless data transport system may further include a second RF transmitter that, in operation, sends non-video data via a different RF band than the first RF transmitter. The tracking subsystem may implement at least one of video tracking, simultaneous localization and mapping (SLAM) tracking, acoustic tracking, inertial tracking, magnetic tracking, or optical tracking. The beam controller may dynamically adjust the beamforming pattern of the antenna array based at least in part on historical tracking data and historical quality data. The beam controller may receive quality data indicative of a quality of the wireless connection between the wireless data transport system and the mobile wireless device; compare the received quality data to a quality threshold; and responsive to a determination that the quality data is below the quality threshold, may dynamically adjust the beamforming pattern of the antenna array based on criteria other than the tracking data. The other criteria may include the received quality data indicative of the quality of the wireless connection. The mobile wireless device may include a head-mounted display (HMD), a tablet computer, a smart phone, or a wearable computer. The beamforming controller may include a multiple input and multiple output (MIMO) controller that, in operation, receive position-dependent previously derived channel state information and select one or more of coefficients, weights, or stream encodings based at least in part on the received channel state information.

A method of operating a wireless data transport system may be summarized as including generating tracking data indicative of a physical position of a mobile wireless device in a tracked volume; receiving the generated tracking data from the tracking subsystem; dynamically adjusting a beamforming pattern of an antenna array based on the tracking data; and transmitting video data wirelessly via the antenna array while the mobile wireless device moves in the tracked volume. Dynamically adjusting a beamforming pattern of the antenna array may include dynamically adjusting a beamforming weight for each of a plurality of antenna sub-elements of the antenna array to modify at least one of the phase shift or amplitude of each of the plurality of antenna sub-elements. Generating tracking data may include generating orientation data that is indicative of the orientation of the mobile wireless device in the tracked volume.

The method may further include receiving quality data indicative of a quality of the wireless connection between the wireless data transport system and the mobile wireless device; and dynamically adjusting the beamforming pattern of the antenna array based at least in part on the received quality data.

The method may further include receiving quality data indicative of a quality of the wireless connection between the wireless data transport system and the mobile wireless device; storing the quality data and corresponding tracking data; analyzing the stored quality data and the corresponding tracking data; and dynamically adjusting the beamforming pattern of the antenna array based at least in part on the analyzed quality data and the corresponding tracking data.

The method may further include sending non-video data to the mobile wireless device via an RF band that is different than an RF band used to send the video data. Generating tracking data may include implementing at least one of video tracking, simultaneous localization and mapping (SLAM) tracking, acoustic tracking, inertial tracking, magnetic tracking, or optical tracking.

The method may further include receiving quality data indicative of a quality of the wireless connection between the wireless data transport system and the mobile wireless device; comparing the received quality data to a quality threshold; and responsive to a determination that the quality data is below the quality threshold, dynamically adjusting the beamforming pattern of the antenna array based on the received quality data instead of the received tracking data.

A method of operating a wireless data transport system may be summarized as including transmitting video data wirelessly to a mobile wireless device present in a tracked volume via a steerable phased-array antenna; and iteratively during the wireless transmission of video data, tracking the physical position of the mobile wireless device; and dynamically adjusting a beamforming pattern of the steerable phased-array antenna to track movement of the mobile wireless device in the tracked volume. Dynamically adjusting a beamforming pattern may include dynamically adjusting beamforming weights of the steerable phased-array antenna.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to systems and methods for providing low latency and high bandwidth wireless data transport for various applications, such as virtual reality, augmented reality, or video applications. In at least some implementations, a wireless data transport system is provided that includes an electrically steerable antenna, such as a phased-array antenna, that is operative to selectively steer its beam based on electronic control input. The wireless data transport system may include a tracking subsystem that is operative to track a mobile wireless device (e.g., HMD, tablet computer, smart phone) as the mobile wireless device moves around in a tracked volume. Advantageously, the wireless data transport system utilizes the known current or predicted future position and/or orientation of the mobile wireless device receiving the data (e.g., video data) from the tracking subsystem and compensates for movement of the mobile wireless device by selectively adjusting the beamforming pattern of the steerable antenna based at least in part on the tracking data received from the tracking subsystem.

Among other things, this feature allows the amount of buffering to be decreased, which decreases latency—a critical parameter in some applications such as VR applications where MTP is an important industry metric. Further, in at least some implementations, tracking data from other objects, such as one or more hand-held controllers, may also be used to detect when a user's hands are moving in a direction that may occlude the receiver antenna of the mobile wireless device. It has been found that even partial occlusion by a user's hand, for example, can cause significant data loss without relying heavily on buffering, interleaving, or forward error correction.

Figure 1:
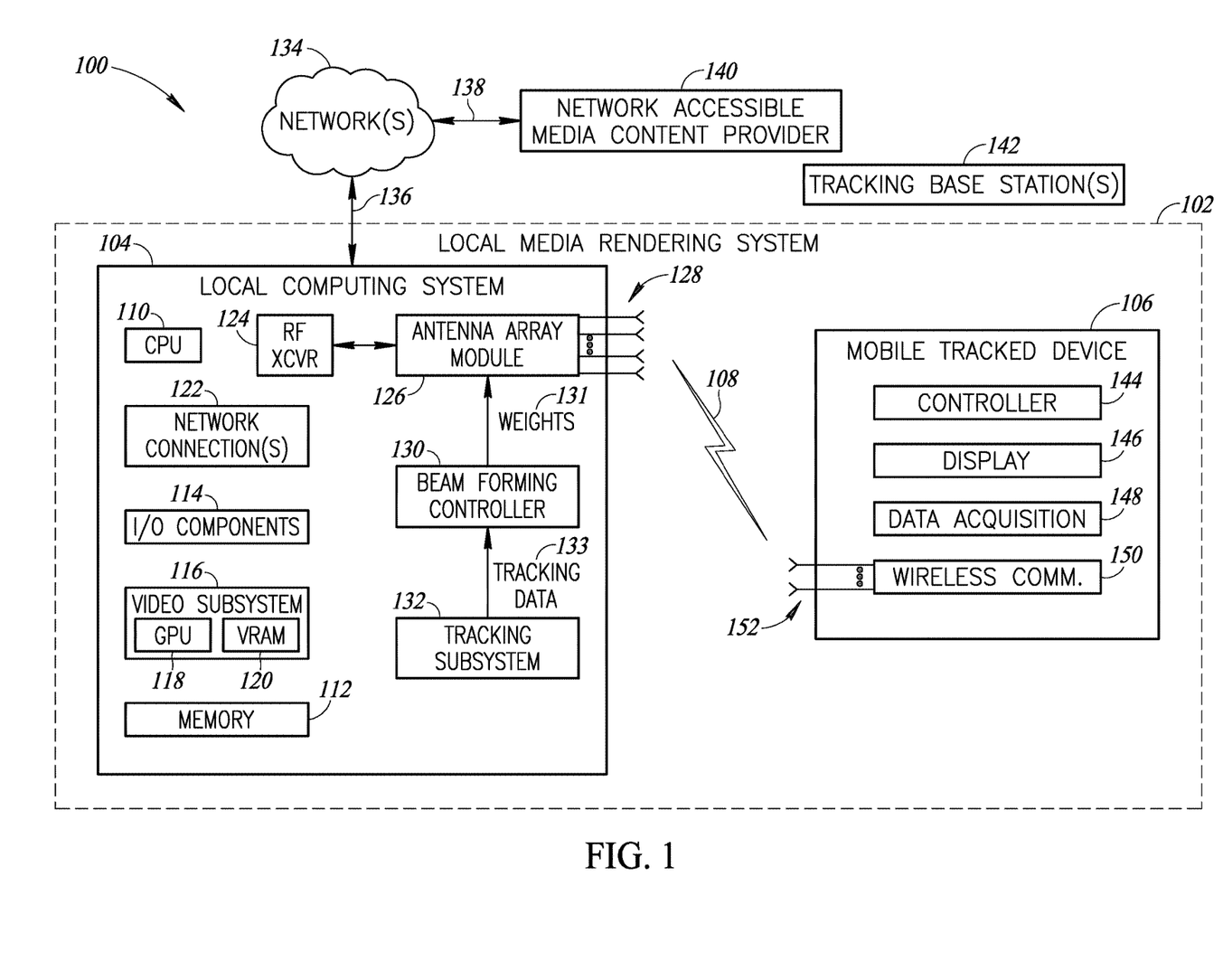
FIG. 1 is a schematic diagram of a networked environment that includes one or more systems suitable for performing at least some techniques described in the present disclosure.

FIG. 1 is a schematic diagram of a networked environment 100 that includes a local media rendering (LMR) system 102 (e.g., a gaming system, desktop computing system, laptop computer), which includes a local computing system 104 and mobile display device 106 (e.g., an HMD with two display panels, a tablet computer, a laptop computer, a smart phone) suitable for performing at least some techniques described herein. In the depicted embodiment of FIG. 1, the local computing system 104 is communicatively connected to the mobile display device 106 via a wireless transmission link 108, discussed further below. In at least some embodiments, the local computing system 104 may provide image data for display to a panel display device (not shown), such as a TV, console, or monitor, via a wired or wireless link. In various embodiments, the local computing system 104 may include, as non-limiting examples, a general purpose computing system; a gaming console; a video stream processing device; a mobile computing device (e.g., a cellular telephone, PDA, or other mobile device); a VR or AR processing device; or other computing system.

In the illustrated embodiment, the local computing system 104 has components that include one or more general hardware processors (e.g., centralized processing units, or "CPUs") 110; processor-readable memory or storage 112; various I/O ("input/output") hardware components 114 (e.g., a keyboard, a mouse, one or more gaming controllers, speakers, microphone, IR transmitter and/or receiver, camera, biofeedback sensors, etc.); a video subsystem 116 that includes one or more specialized hardware processors (e.g., graphics processing units, or "GPUs") 118 and video memory (VRAM) 120; computer-readable storage 150; and one or more wired or wireless network connections 122. In at least some implementations, the local computing system 104 may implement a unified memory architecture wherein a pool of managed memory is shared between one or more CPUs and one or more GPUs.

The local computing system 104 is also, in the depicted embodiment, communicatively connected via one or more computer networks 134 and network links 136 to an exemplary network-accessible media content provider 140 via one or more links 138 that may further provide content to the local computing system 104 for display. The media content provider 140 may include one or more computing systems (not shown) that may each have components similar to those of local computing system 104, including one or more hardware processors, I/O components, local storage devices and memory, although some details are not illustrated for the media content server computing systems for the sake of brevity.

It will also be appreciated that the local computing system 104 and the mobile wireless device 106 are merely illustrative and are not intended to limit the scope of the present disclosure. The computing system may instead include multiple interacting computing systems or devices, and may be connected to other devices that are not illustrated, including through one or more networks such as the Internet, via the Web, or via private networks (e.g., mobile communication networks, etc.). More generally, a computing system or other computing node may comprise any combination of hardware or software that may interact and perform the described types of functionality, including, without limitation, desktop or other computers, game systems, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities.

The mobile wireless device 106 may similarly include one or more devices with one or more display panels of various types and forms, and optionally include various other hardware and/or software components. For example, in the illustrated implementation the mobile wireless device 106 is shown as including a controller 144 (e.g., one or more microcontrollers, processors), one or more displays 146, a data acquisition subsystem 148 which may be used to provide tracking data to the local computing system 104, discussed further below, and a wireless communications subsystem 150 and associated antenna(s) 152 that may be used to facilitate wireless communication with the local computing system 104 or other devices (e.g., one or more game controllers).

It will also be appreciated that, while various items are illustrated as being stored in memory or on storage while being used, these items or portions of them may be transferred between memory and other storage devices for purposes of memory management and data integrity. Thus, in some embodiments, some or all of the described techniques may be performed by hardware means that include one or more processors or other configured hardware circuitry and/or memory and/or storage, such as when configured by one or more software programs and/or data structures (e.g., by execution of software instructions of the one or more software programs and/or by storage of such software instructions and/or data structures). Some or all of the components, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

The local computing system 104 may also include a tracking subsystem 132 that is operative to track the current of predicted future position, orientation, and/or movement of the mobile wireless device 106 as it moves around in a tracked volume (e.g., during play of a VR video game). As discussed further below, the tracking subsystem 132 may receive data from the data acquisition subsystem 148 via the wireless transmission link 108. In at least some implementations, the tracking subsystem 132 or the data acquisition subsystem 148 may utilize one or more tracking base stations 142 fixedly positioned in or proximate to the tracked volume that facilitate tracking of the mobile wireless device 106 in the tracked volume. Various non-limiting examples of implementations of the tracking subsystem 132 are discussed below.

The local computing system 104 may also include a radio frequency (RF) transceiver 124 that is operatively coupled to an electronically steerable antenna array module 126 ("antenna array") that includes a plurality of antenna sub-elements 128. The local computing system 104 also includes a beamforming controller 130 that is operative to dynamically selectively adjust the beamforming pattern of the antenna array 126. In at least some implementations, the beamforming controller 130 dynamically adjusts beamforming weights or coefficients 131 to selectively modify at least one of the phase shift and amplitude of each of the antenna sub-elements to provide constructive/destructive interference to effectively steer or adjust the beamforming pattern of the antenna array 126 in a desired direction. As described further below, the beamforming controller 130 receives tracking data 133 from the tracking subsystem 132, and utilizes the tracking data to compensate for movement of the mobile wireless device 106 in the tracked volume by causing the beamforming pattern of the antenna array 126 to track the mobile wireless device 106, thereby causing the amount of buffering required to be decreased, which decreases latency.

The RF transceiver 124 (or RF transmitter), beamforming controller 130 and antenna array module 126 may comprise any type and combination of components to achieve the functionality discussed herein. Generally, the components includes a phased antenna array or "electronically scanned array," which may be a planar or non-planar array of antenna sub-elements in which the beam can be steered electronically to point in any direction over a wide angle in front of the array, without physically moving the antenna. In operation, current from the transmitter 124 is fed to each component antenna through a phase shifter in the antenna array module 126, which phase shifters are controlled by a controller (e.g., beamforming controller 130) by varying the individual beamforming weights or coefficients for each of the sub-elements. By changing the relative phase and amplitude of the feed currents, the beam can instantly be pointed in different directions. The antenna sub-elements may be fed from a single transmitter or receiver through phase shifters, or each antenna sub-element may have its own transmitter and/or receiver module, controlled by the beamforming controller 130.

In at least some implementations, the RF transceiver 124 (or RF transmitter) operates in the millimeter wave band (i.e., 30 GHz-300 GHz), for example 60 GHz (e.g., IEEE 802.11ad), which advantageously utilizes transmit and/or receive beamforming to improve communications range at multi-gigabit speeds. At such millimeter wavelengths, propagation path loss, which is proportional to carrier frequency, is generally too severe to allow for acceptable communication range without deploying beamforming at either or both sides of the wireless link. In present applications, beamforming solvers are optimized for non-mobile targets, such as televisions or monitors. To use beamforming for VR/AR applications, the system may utilize buffering or other methods to accommodate the beamforming controller's need to reconfigure itself for optimal data throughput as the user moves around a tracked volume. In a non-moving receiver application, the beamforming controller only has to compensate for occasional disturbances, which requires less buffering. Advantageously, one or more implementations of the present disclosure use the tracking data 133 (e.g., position data, orientation data) from the tracking subsystem 132 to dynamically adjust the beamforming pattern of the antenna array 126 to track the mobile wireless device 106 as it moves in the tracked volume.

Figure 2:
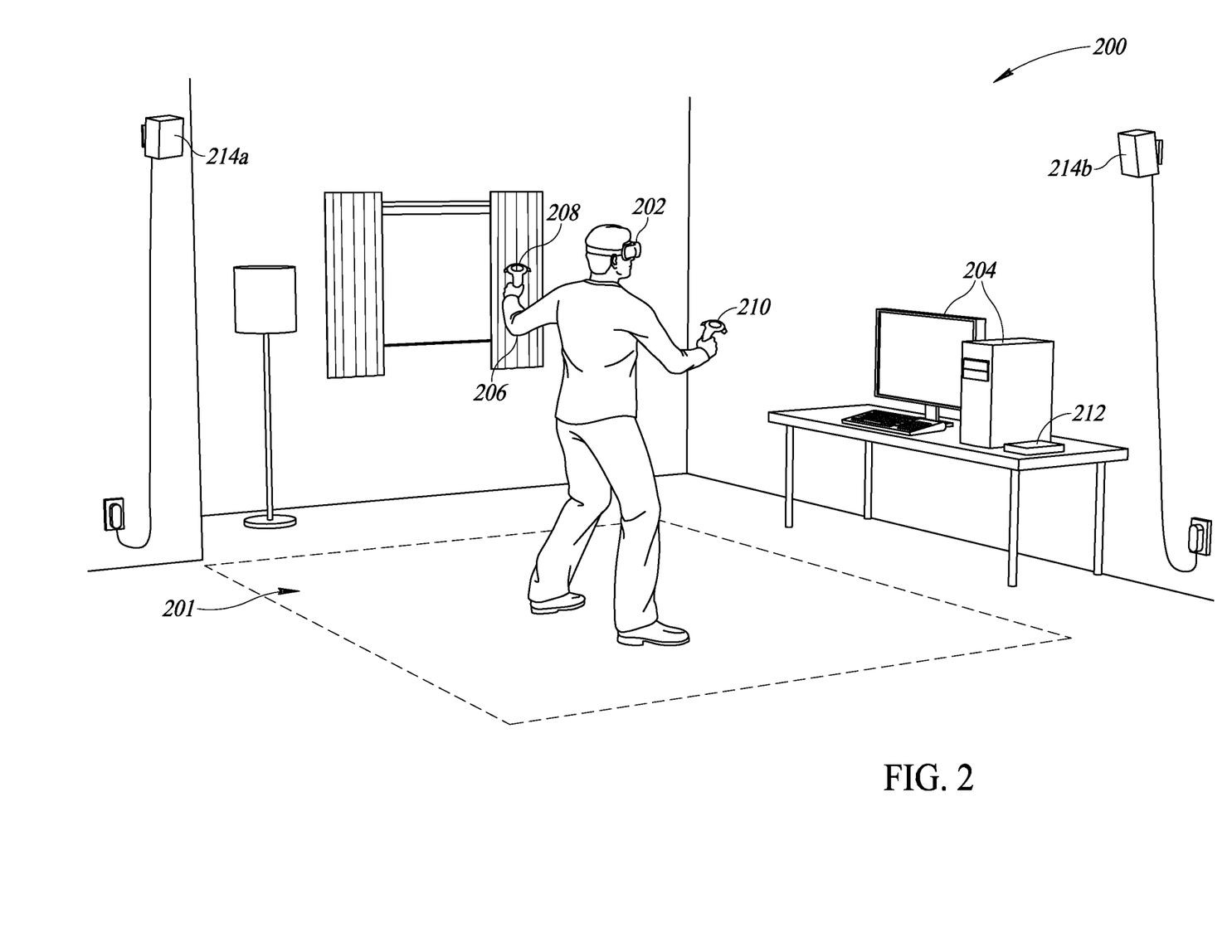
FIG. 2 is a pictorial diagram illustrating an example environment in which at least some of the described techniques are used with an example head-mounted display device that is wirelessly coupled to a local video rendering computing system and is providing a virtual reality display to a user.

FIG. 2 illustrates an example environment 200 in which at least some of the described techniques are used with an example HMD device 202 that is coupled to a video rendering computing system 204 via a wireless connection to provide a virtual reality display to a human user 206. In this example, the wireless communication functionality may be provided by a separate wireless communications module 212 that is operatively coupled to the computing system 204. In other implementations, the wireless communications functionalities may be provided within the computing system 204 or via two or more computing systems.

The user wears the HMD device 202 and receives displayed information via the HMD device from the computing system 204 of a simulated environment different from the actual physical environment, with the computing system acting as an image rendering system that supplies images of the simulated environment to the HMD device for display to the user, such as images generated by a game program and/or other software program executing on the computing system. The user is further able to move around within a tracked volume 201 of the actual physical environment 200 in this example, and may further have one or more I/O ("input/output") devices to allow the user to further interact with the simulated environment, which in this example includes hand-held controllers 208 and 210.

The environment 200 may include one or more base stations 214 (two shown, labeled base stations 214a and 214b) that may facilitate tracking of the HMD device 202 and/or the controllers 208 and 210. As the user moves location and/or changes orientation of the HMD device 202, the position of the HMD device is tracked, such as to allow a corresponding portion of the simulated environment to be displayed to the user on the HMD device, and the controllers 208 and 210 may further employ similar techniques to use in tracking the positions of the controllers (and to optionally use that information to assist in determining and/or verifying the position of the HMD device). After the tracked position of the HMD device 202 is known, corresponding information is transmitted to the computing system 204 wirelessly, which uses the tracked position information to generate one or more next images of the simulated environment to display to the user and to dynamically steer the beamforming pattern of the antenna array 126.

There are numerous different methods of positional tracking that may be used in the various implementations of the present disclosure, including, but not limited to, acoustic tracking, inertial tracking, magnetic tracking, optical tracking, combinations thereof, etc.

In at least some implementations, the HMD device 202 may include one or more optical receivers or sensors that may be used to implement tracking functionality or other aspects of the present disclosure. For example, the base stations 214 may each sweep an optical signal across the tracked volume 201. Depending on the requirements of each particular implementation, each base station 214 may generate more than one optical signal. For example, while a single base station 214 is typically sufficient for six-degree-of-freedom tracking, multiple base stations (e.g., base stations 214a, 214b) may be necessary or desired in some embodiments to provide robust room-scale tracking for HMD devices and peripherals. In this example, optical receivers are incorporated into the HMD device 202 and or other tracked objects, such as the controllers 208 and 210. In at least some implementations, optical receivers may be paired with an accelerometer and gyroscope Inertial Measurement Unit ("IMU") on each tracked device to support low-latency sensor fusion.

In at least some implementations, each base station 214 includes two rotors which sweep a linear beam across the tracked volume 201 on orthogonal axes. At the start of each sweep cycle, the base station 214 may emit an omni-directional light pulse (referred to as a "sync signal") that is visible to all sensors on the tracked objects. Thus, each sensor computes a unique angular location in the swept volume by timing the duration between the sync signal and the beam signal. Sensor distance and orientation may be solved using multiple sensors affixed to a single rigid body.

The one or more sensors positioned on the tracked objects (e.g., HMD device 202, controllers 208 and 210) may comprise an optoelectronic device capable of detecting the modulated light from the rotor. For visible or near-infrared (NIR) light, silicon photodiodes and suitable amplifier/detector circuitry may be used. Because the environment 200 may contain static and time-varying signals (optical noise) with similar wavelengths to the signals of the base stations 214 signals, in at least some implementations the base station light may be modulated in such a way as to make it easy to differentiate from any interfering signals, and/or to filter the sensor from any wavelength of radiation other than that of base station signals.

Inside-out tracking is also a type positional tracking that may be used to track the position of the HMD device 202 and/or other objects (e.g., controllers 208 and 210, tablet computers, smartphones). Inside-out tracking differs from outside-in tracking by the location of the cameras or other sensors used to determine the HMD's position. For inside-out tracking, the camera or sensors are located on the HMD, or object being tracked, while in outside-out tracking the camera or sensors are placed in a stationary location in the environment.

An HMD that utilizes inside-out tracking utilizes one or more cameras to "look out" to determine how its position changes in relation to the environment. When the HMD moves, the sensors readjust their place in the room and the virtual environment responds accordingly in real-time. This type of positional tracking can be achieved with or without markers placed in the environment. The cameras that are placed on the HMD observe features of the surrounding environment. When using markers, the markers are designed to be easily detected by the tracking system and placed in a specific area. With "markerless" inside-out tracking, the HMD system uses distinctive characteristics (e.g., natural features) that originally exist in the environment to determine position and orientation. The HMD system's algorithms identify specific images or shapes and use them to calculate the device's position in space. Data from accelerometers and gyroscopes can also be used to increase the precision of positional tracking.

Figure 3:
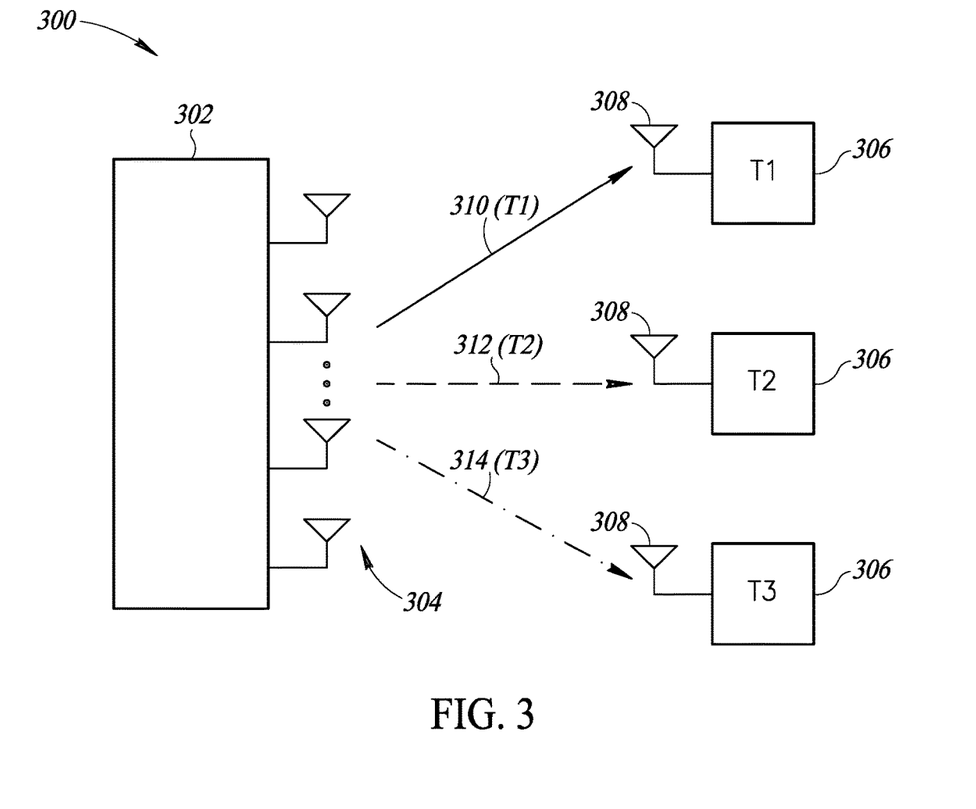
FIG. 3 is a schematic diagram of an embodiment of a wireless data transport system that uses a steerable phased-array antenna system to communicate wirelessly with a mobile wireless device, such as an HMD device, according to one non-limiting illustrated implementation.

FIG. 3 is a schematic block diagram of an environment 300 in which a wireless data transport system 302 may be used to send data, such as video data, to a mobile wireless device 306 using the high bandwidth and low latency techniques described herein, according to one non-limiting illustrated implementation. As non-limiting examples, the wireless data transport system 302 may be similar or identical to the local computing systems 104 and 204 of FIGS. 1 and 2, respectively, and the mobile wireless device 306 may be similar or identical to the mobile wireless devices 106 and 202 of FIGS. 1 and 2, respectively. The wireless data transport system 302 includes an RF transceiver and a steerable antenna array 304, as discussed above. The mobile wireless device 306 includes an RF antenna 308 and associated receiver circuitry.

In the simplified illustration provided in FIG. 3, the mobile wireless device 306 is shown in three different positions at times T1 (top of FIG. 3), T2 (middle of FIG. 3), and T3 (bottom of FIG. 3) to indicate that the mobile wireless device moves within the environment. As the mobile wireless device 306 moves in the environment, the wireless data transport system 302 tracks the movement of the mobile wireless device using the techniques discussed above and dynamically adjusts the beamforming pattern of the antenna array 304 to be directed at the mobile wireless device.

In the illustrated example, the RF transceiver of the wireless data transport system 302 transmits an outbound RF signal containing outbound data via the array antenna 304 at time T1 using a beam 310 directed at the location of the mobile wireless device 306 at time T1, sends a beam 312 at time T2 directed at the location of the mobile wireless device 306 at time T2, and sends a beam 314 at time T3 directed at the location of the mobile wireless device 306 at the time T3. More generally, the wireless data transport system 302 dynamically configures the antenna array 304 to provide a plurality of different beamforming patterns that may be dynamically directed toward the mobile wireless device 306 as the device moves around in the environment.

Figure 4A:
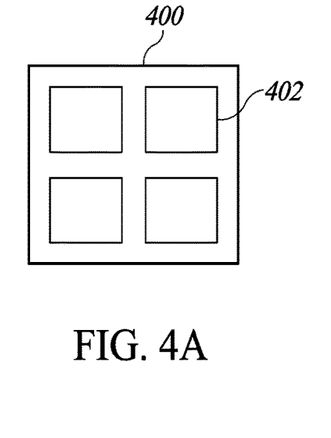
FIG. 4A illustrates an example planar phased-array antenna that includes four antenna sub-elements, according to one non-limiting illustrated implementation.
Figure 4B:
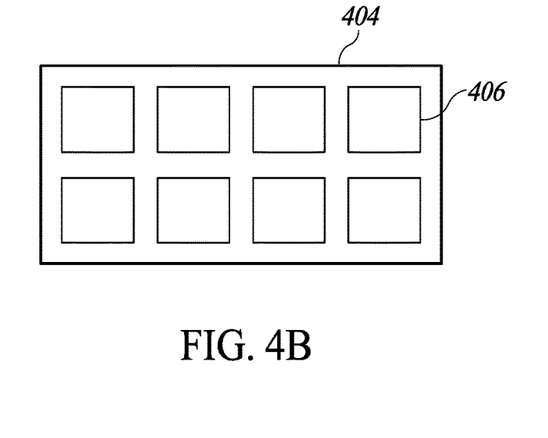
FIG. 4B illustrates an example planar phased-array antenna that includes eight antenna sub-elements arranged in two rows of four sub-elements, according to one non-limiting illustrated implementation.

FIG. 4A illustrates a non-limiting example of a planar antenna array 400 that may be used to implement the features of the present disclosure. The antenna array 400 includes two rows of two antenna sub-elements 402 (i.e., 2×2 array). FIG. 4B illustrates a non-limiting example of a planar antenna array 404 that may be used to implement the features of the present disclosure. The antenna array 404 includes two rows of four antenna sub-elements 406 (i.e., 2×4 array). It should be appreciated that the shape, configuration, and number of antenna sub-elements may be selected based on the particular requirements for a given application. Thus, other antenna sub-element configurations, such as 2×8, 2×10, 2×12, 8×8, 4×10, non-rectangular shapes, etc., may be used to implement the functionality of the present disclosure.

Figure 5:
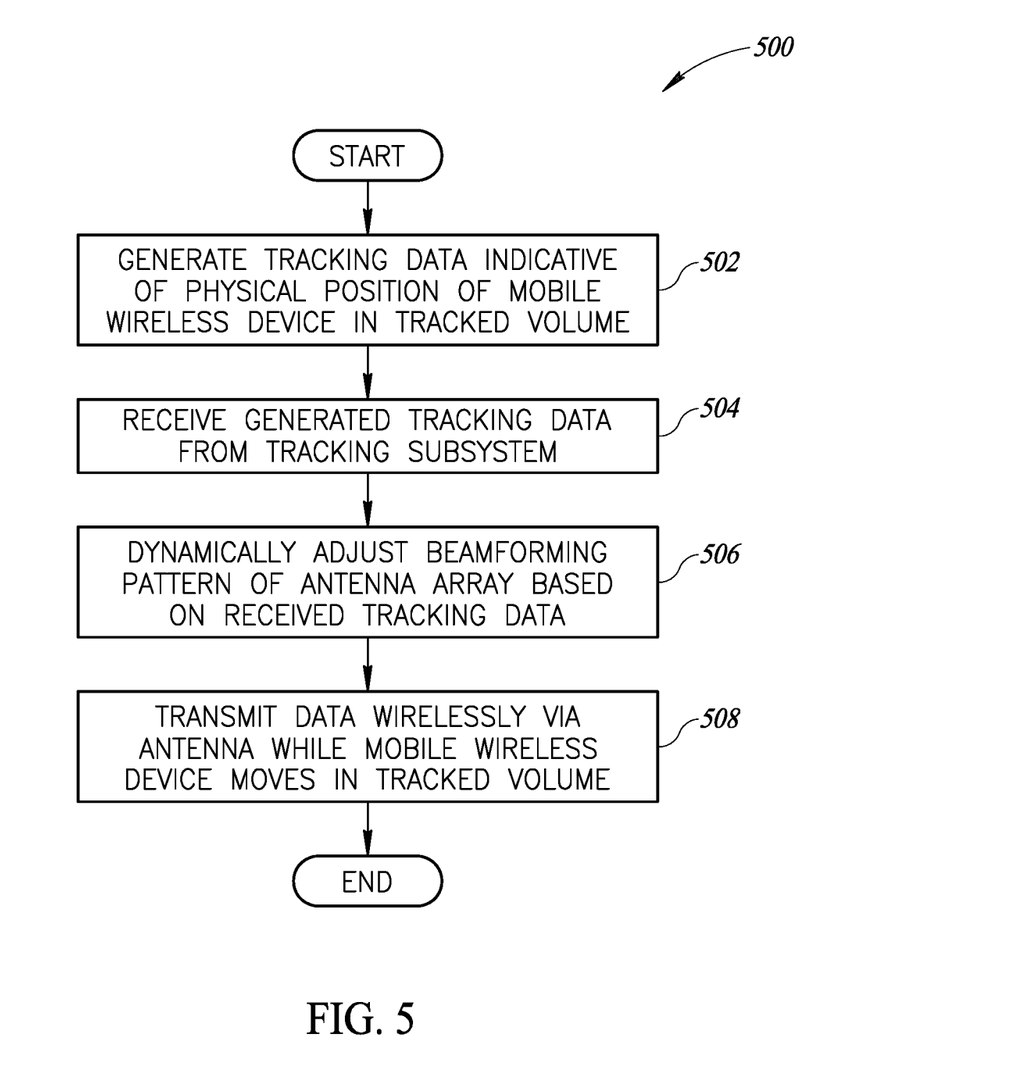
FIG. 5 is a flow diagram for a method of operating a wireless data transport system to provide data to a mobile wireless device, according to one non-limiting illustrated implementation.

FIG. 5 illustrates a flow diagram for a method 500 of operating a wireless data transport system to send data wirelessly at a high bandwidth and low latency to a mobile wireless device, such as an HMD device. The method 500 may be implemented by a device similar or identical to one of the wireless data transport systems 104 and 204 of FIGS. 1 and 2, respectively, and the data may be received by a device similar or identical to one of the mobile wireless devices 106 and 202 of FIGS. 1 and 2, respectively.

At 502, the wireless data transport system may generate tracking data indicative of a physical position of the mobile wireless device in a tracked volume. For example, the wireless data transport system may receive data acquired by an acquisition unit (e.g., acquisition subsystem 148) of the wireless mobile device, which may include data obtained from one or more sensors responsive to signals detected from one or more base stations, as discussed above. The tracking data may additionally include orientation data or motion data that is indicative of the orientation or movement of the mobile wireless device in the tracked volume.

In at least some implementations, the tracking data may include data indicative of a physical position, orientation, or movement of at least one object in the tracked volume other than the tracked mobile wireless device, such as one or more controllers, one or more stationary objects (e.g., wall, ceiling, floor), one or more movable objects (portion of the user's or another person's body), etc. In at least some implementations, the tracking data may include historical data that may be used to determine past motion or to predict future motion of one or more objects, which facilitates improved tracking capabilities. The tracking subsystem may utilize any of numerous types of tracking technologies including, but not limited to video tracking, simultaneous localization and mapping (SLAM) tracking, acoustic tracking, inertial tracking, magnetic tracking, optical tracking, combinations thereof, etc.

At 504, a beamforming controller of the wireless data transport system may receive the generated tracking data from the tracking subsystem. As discussed above, the beamforming controller is operatively coupled to a steerable antenna array, such as a phased-array antenna. In at least some implementations, the antenna array includes a planar phased-array antenna comprising plurality of antenna sub-elements coupled to a corresponding plurality of adjustable phase shifters. As an example, the beamforming controller may repeatedly receive updated tracking data periodically (e.g., every 10 ms, every 20 ms, every 100 ms) as a user wearing the mobile wireless device moves around in a tracked volume, such as when playing a VR game. The tracking data may include position data, orientation data indicative of the orientation of the mobile wireless device, motion data indicative of past or predicted movement of the mobile wireless device, or tracking data relating to other stationary objects (e.g., wall, ceiling, furniture, obstacles) or mobile objects (e.g., hand-held controllers, the user's body).

At 506, the beamforming controller may dynamically adjust the beamforming pattern of the steerable antenna array based at least in part on the received tracking data. As discussed above, the beamforming controller may dynamically adjust the beamforming pattern of the antenna array by modifying the beamforming weights or coefficients that selectively adjust the phase shift and amplitude of each of the antenna sub-elements of the antenna array.

At 508, the wireless data transport system may wirelessly transmit data (e.g., video data) to the mobile device using the antenna array while its beam is dynamically directed at the mobile wireless device as the device moves around the tracked volume. As discussed above, in at least some implementations, the wireless data transport system may utilize an RF transmitter that operates in the millimeter wave band (e.g., 60 GHz band), which advantageously utilizes transmit and/or receive beamforming to improve bandwidth and provide low latency.

In at least some implementations, the beamforming controller dynamically adjusts the beamforming pattern of the antenna array based at least in part on the tracking data indicative of the current or predicted future physical position of the at least one other object, such as the location of a controller, a portion of a user's body, or a stationary or mobile obstacle. As an example, the beamforming controller may analyze the tracking data to determine that a controller is currently or will soon be occluding a direct path between the antenna array of the wireless data transport system and the receiver of the mobile device. Responsive to such detection, the beamforming controller may modify the beamforming pattern to a direction that is known or predicted to provide a better wireless connection. For example, the beamforming controller may direct the beamforming pattern toward a ceiling, floor, or wall to provide a reflected path rather than a direct sight path. The beamforming may cycle or sweep through multiple patterns in search of a path that provides a quality wireless connection. Such paths determined to be suitable or optimal may be stored for use in future similar situations (e.g., each time the receiver is subsequently occluded).

In at least some implementations, such alternative paths may be chosen based real-time tracking data and connection quality data (e.g., received signal strength indicator (RSSI)) via an iterative process (e.g., sweeping the beamforming pattern while monitoring quality data). In at least some implementations, the alternative paths may be chosen based on historical tracking data and historical quality data, wherein the system learns over time via a calibration process or during normal use which beam patterns are likely to provide the best wireless connections for particular circumstances (e.g., occluded receiver, position in a tracked volume, type of user movement).

Data other than the video data, such as control data, status data, tracking data, or other data that does not require the same bandwidth as video, may be communicated between wireless data transport system and the mobile wireless device (or other devices) using one or more different communications channels than the channel used for sending the video data. For example, the video data may be sent by a first RF transmitter that operates in the millimeter wave band, as discussed above, and the other data may be communicated through one or more different transmitters that operate at 2.4 GHz (e.g., IEEE 802.11g, Bluetooth®) or 5.0 GHz (e.g., IEEE 802.11ac).

In at least some implementations, the beam controller may compare received connection quality data (e.g., RSSI) to a quality threshold. In such implementations, responsive to a determination that the quality data is below the quality threshold while using the tracking data, the beam controller may dynamically adjust the beamforming pattern of the antenna array based on criteria other than the tracking data. For instance, the beam controller may determine that using the tracking data provides a poor wireless connection for some reason (e.g., signal path is occluded), and responsive to such, may control the beam pattern using received connection quality data to find a better path. In such instances, the beam controller may iteratively return to using the tracking data for beam steering to determine whether the performance using the tracking data has improved to a level that is better than performance that can be achieved using conventional beamforming methods. Thus, in such implementations, conventional beamforming methods may act as a performance floor, while using the tracking-based beamforming methods discussed herein to improve performance when possible.

Advantageously, by using the tracking data as discussed herein, the optimal coefficients for the phased-array antenna may be determined much more rapidly than in conventional systems. In conventional "untracked" systems, a beamforming training process that includes one or more directional sweeps may be implemented to determine the optimal antenna configuration for a transmitter/receiver pair. For example, in some conventional systems, an initial broad sweep may be performed to determine one of several directional regions or sectors in which to direct the beam. Then, a second refinement may be performed in the selected sector to further optimize the direction of the beam. Such a process is time consuming and has to be repeated whenever there is disturbance or significant movement. In the tracked systems disclosed herein, the coefficients may be calculated directly without requiring such sweeps since the physical location of the receiving system is known from the tracking data. The system may also store coefficients that have been determined to work well for a plurality of positions in memory, and may retrieve appropriate coefficients from memory based on the tracked position of the receiving system. Additionally or alternatively, rather than one or more broad sweeps, the system may search a relatively narrow area (e.g., with a narrow sweep) using the known position of the receiving system, which significantly reduces the time required to determine the coefficients that provide the optimal antenna configuration. Additionally, as noted above, since the system may predict future positions of the receiving system, the coefficients may be adapted prior the occurrence of problematic occlusions or motions occur, thereby further reducing the time required to steer the beam toward the receiving system. In addition to latency and buffering improvements, better coefficient selection allows the data link to operate at its higher data rates more often. Poor path choices force the transmitter to use a less aggressive modulation scheme, which causes a lower data rate to be used to provide an acceptable error rate.

In at least some implementations, the system may dynamically renegotiate the buffer length based on the data link quality, which may significantly reduce latency (e.g., by 2 ms, 5 ms). For example, if the system determines that link integrity is high, the system may reduce the size of the buffer (e.g., circular buffer) to reduce the latency of the system. Since the tracking system allows for better path choices that result in higher link integrity, as discussed above, on average the system may utilize a smaller buffer that provides reduced latency. When link integrity is low (e.g., due to environmental conditions or an occluded receiver), the buffer size may be dynamically increased until the link integrity has improved.

In at least some implementations, the systems and methods provided herein may utilize multiple input and multiple output (MIMO) technology to implement beamforming. In such instances, the transmitting system may include multiple antennas (e.g., an antenna array) and the receiving system may include one or multiple antennas. MIMO takes advantage of the fact that data transmitted between a sending antenna and a receiving antenna undergoes filtering from the environment. The signal may be reflected off objects (e.g., walls, furniture), and these reflections will have an associated delay, attenuation, and direction of arrival. To take advantage of the multiple paths to provide faster and more reliable data transfer, the spatial channel between antenna elements may be characterized. This characterization is referred to as channel state information (CSI), which is effectively a collection of the spatial transfer functions between each antenna and the receiving system. The CSI may used to digitally encode and decode the data transmitted from and received by the antenna array. The CSI may be updated as needed to maintain accurate information (e.g., as a receiving system moves in an environment). Accordingly, in such implementations wherein the beam controller utilizes MIMO technology, the MIMO controller may receive position-dependent previously derived CSI, and may select one or more of coefficients, weights, or stream encodings based on the received CSI. Additionally, since the MIMO variables are more difficult to directly calculate than non-MIMO beamforming, it may be advantageous in at least some implementations to use memory to store the various combinations of coefficients, weights, and/or stream encodings for lookup, rather than directly calculating such variables on the fly.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A wireless data transport system, comprising:
 a tracking subsystem that in operation generates tracking data indicative of a physical position of a mobile wireless device as the mobile wireless device is moved in a tracked volume, the tracking data comprising prediction data indicative of a future physical position of the mobile wireless device;
 an antenna array that is selectively configurable to provide a plurality of beamforming patterns;
 a radio frequency (RF) transmitter operatively coupled to the antenna array, in operation, the RF transmitter sends data wirelessly to the mobile wireless device via the antenna array; and
 a beamforming controller operatively coupled to the tracking subsystem and the antenna array, in operation, the beamforming controller:
  receives the generated tracking data from the tracking subsystem; and
  dynamically adjusts the beamforming pattern of the antenna array based at least in part on the tracking data, including the prediction data indicative of the future physical position of the mobile wireless device, received from the tracking subsystem.

2. The wireless data transport system of claim 1 wherein the antenna array comprises a planar phased-array antenna comprising plurality of antenna sub-elements.

3. The wireless data transport system of claim 2 wherein, to dynamically adjust the beamforming pattern of the antenna array, the beamforming controller dynamically adjusts a beamforming weight for each of the plurality of antenna sub-elements to modify at least one of the phase shift or amplitude of each of the plurality of antenna sub-elements.

4. The wireless data transport system of claim 3 wherein the beamforming controller directly calculates a value of the beamforming weight for each of the plurality of antenna sub-elements based on the tracking data received from the tracking subsystem.

5. The wireless data transport system of claim 3 wherein the beamforming controller obtains a value of the beamforming weight for each of the plurality of antenna sub-elements from memory based on the tracking data received from the tracking subsystem.

6. The wireless data transport system of claim 1 wherein the RF transmitter operates at one or more frequency bands between 30 GHz and 300 GHz.

7. The wireless data transport system of claim 1 wherein the RF transmitter operates at the 60 GHz frequency band.

8. The wireless data transport system of claim 1 wherein tracking data generated by the tracking subsystem further comprises orientation data that is indicative of the orientation of the mobile wireless device in the tracked volume.

9. The wireless data transport system of claim 1 wherein the tracking subsystem generates tracking data indicative of a physical position of at least one object in the tracked volume other than the tracked mobile wireless device.

10. The wireless data transport system of claim 9 wherein the beamforming controller dynamically adjusts the beamforming pattern of the antenna array based at least in part on the tracking data indicative of the physical position of the at least one other object.

11. The wireless data transport system of claim 9 wherein the at least one other object comprises at least one of: a hand-held controller, a portion of a human body, a stationary object, or a physical boundary of the tracked volume.

12. The wireless data transport system of claim 1 wherein the beam controller:
 receives quality data indicative of a quality of the wireless connection between the wireless data transport system and the mobile wireless device; and
 dynamically adjusts the beamforming pattern of the antenna array based at least in part on the received quality data.

13. The wireless data transport system of claim 1 wherein the RF transmitter sends video data wirelessly to the mobile wireless device via the antenna array.

14. The wireless data transport system of claim 13 wherein the RF transmitter is a first RF transmitter, and the wireless data transport system further comprises a second RF transmitter that, in operation, sends non-video data via a different RF band than the first RF transmitter.

15. The wireless data transport system of claim 1 wherein the tracking subsystem implements at least one of video tracking, simultaneous localization and mapping (SLAM) tracking, acoustic tracking, inertial tracking, magnetic tracking, or optical tracking.

16. The wireless data transport system of claim 1 wherein the beam controller dynamically adjusts the beamforming pattern of the antenna array based at least in part on historical tracking data and historical quality data.

17. The wireless data transport system of claim 1 wherein the mobile wireless device is comprises a head-mounted display (HMD), a tablet computer, a smart phone, or a wearable computer.

18. The wireless data transport system of claim 1 wherein the beamforming controller comprises a multiple input and multiple output (MIMO) controller that, in operation, receives position-dependent previously derived channel state information and selects one or more of coefficients, weights, or stream encodings based at least in part on the received channel state information.

19. A wireless data transport system, comprising:
 a tracking subsystem that in operation generates tracking data indicative of a physical position of a mobile wireless device as the mobile wireless device is moved in a tracked volume;
 an antenna array that is selectively configurable to provide a plurality of beamforming Patterns;
 a radio frequency (RF) transmitter operatively coupled to the antenna array, in operation, the RF transmitter sends data wirelessly to the mobile wireless device via the antenna array; and
 a beamforming controller operatively coupled to the tracking subsystem and the antenna array, in operation, the beamforming controller:
  receives the generated tracking data from the tracking subsystem;
  dynamically adjusts the beamforming pattern of the antenna array based at least in part on the tracking data received from the tracking subsystem;
  receives quality data indicative of a quality of the wireless connection between the wireless data transport system and the mobile wireless device;
  stores the quality data and corresponding tracking data;

analyzes the stored quality data and the corresponding tracking data; and dynamically adjusts the beamforming pattern of the antenna array based at least in part on the analyzed quality data and the corresponding tracking data.

20. A wireless data transport system, comprising:

a tracking subsystem that in operation generates tracking data indicative of a physical position of a mobile wireless device as the mobile wireless device is moved in a tracked volume;

an antenna array that is selectively configurable to provide a plurality of beamforming patterns;

a radio frequency (RF) transmitter operatively coupled to the antenna array, in operation, the RF transmitter sends data wirelessly to the mobile wireless device via the antenna array; and a beamforming controller operatively coupled to the tracking subsystem and the antenna array, in operation, the beamforming controller:

receives the generated tracking data from the tracking subsystem;

dynamically adjusts the beamforming pattern of the antenna array based at least in part on the tracking data received from the tracking subsystem;

receives quality data indicative of a quality of the wireless connection between the wireless data transport system and the mobile wireless device;

compares the received quality data to a quality threshold; and responsive to a determination that the quality data is below the quality threshold, dynamically adjusts the beamforming pattern of the antenna array based on criteria other than the tracking data.

21. The wireless data transport system of claim 20 wherein the other criteria comprises the received quality data indicative of the quality of the wireless connection.

22. A wireless data transport system, comprising:

a tracking subsystem that in operation generates:

tracking data indicative of a physical position of a mobile wireless device as the mobile wireless device is moved in a tracked volume; and tracking data indicative of a physical position of at least one object in the tracked volume other than the tracked mobile wireless device;

an antenna array that is selectively configurable to provide a plurality of beamforming patterns;

a radio frequency (RF) transmitter operatively coupled to the antenna array, in operation, the RF transmitter sends data wirelessly to the mobile wireless device via the antenna array;

a beamforming controller operatively coupled to the tracking subsystem and the antenna array, in operation, the beamforming controller:

receives the generated tracking data from the tracking subsystem;

dynamically adjusts the beamforming pattern of the antenna array based at least in part on the tracking data received from the tracking subsystem indicative of the physical position of the mobile wireless device; and dynamically adjusts the beamforming pattern of the antenna array based on the tracking data indicative of the physical position of the at least one other object to a direction that is determined to provide a better wireless connection between the wireless data transport system and the mobile wireless device.

23. The wireless data transport system of claim 22 wherein the at least one other object comprises at least one of: a hand-held controller, a portion of a human body, a stationary object, or a physical boundary of the tracked volume.

24. The wireless data transport system of claim 22 wherein the antenna array comprises a planar phased-array antenna comprising plurality of antenna sub-elements.

25. The wireless data transport system of claim 24 wherein, to dynamically adjust the beamforming pattern of the antenna array, the beamforming controller dynamically adjusts a beamforming weight for each of the plurality of antenna sub-elements to modify at least one of the phase shift or amplitude of each of the plurality of antenna sub-elements.

26. The wireless data transport system of claim 25 wherein the beamforming controller directly calculates a value of the beamforming weight for each of the plurality of antenna sub-elements based on the tracking data received from the tracking subsystem.

27. The wireless data transport system of claim 25 wherein the beamforming controller obtains a value of the beamforming weight for each of the plurality of antenna sub-elements from memory based on the tracking data received from the tracking subsystem.

28. The wireless data transport system of claim 22 wherein the RF transmitter operates at one or more frequency bands between 30 GHz and 300 GHz.

29. The wireless data transport system of claim 22 wherein the RF transmitter operates at the 60 GHz frequency band.

30. The wireless data transport system of claim 22 wherein tracking data generated by the tracking subsystem further comprises orientation data that is indicative of the orientation of the mobile wireless device in the tracked volume.

31. The wireless data transport system of claim 22 wherein the beam controller:

receives quality data indicative of a quality of the wireless connection between the wireless data transport system and the mobile wireless device; and dynamically adjusts the beamforming pattern of the antenna array based at least in part on the received quality data.

32. The wireless data transport system of claim 22 wherein the tracking subsystem implements at least one of video tracking, simultaneous localization and mapping (SLAM) tracking, acoustic tracking, inertial tracking, magnetic tracking, or optical tracking.

33. The wireless data transport system of claim 22 wherein the beam controller dynamically adjusts the beamforming pattern of the antenna array based at least in part on historical tracking data and historical quality data.

* * * * *